Nov. 7, 1944.  R. E. MILLER ET AL  2,362,213
TORCH
Filed Aug. 5, 1941
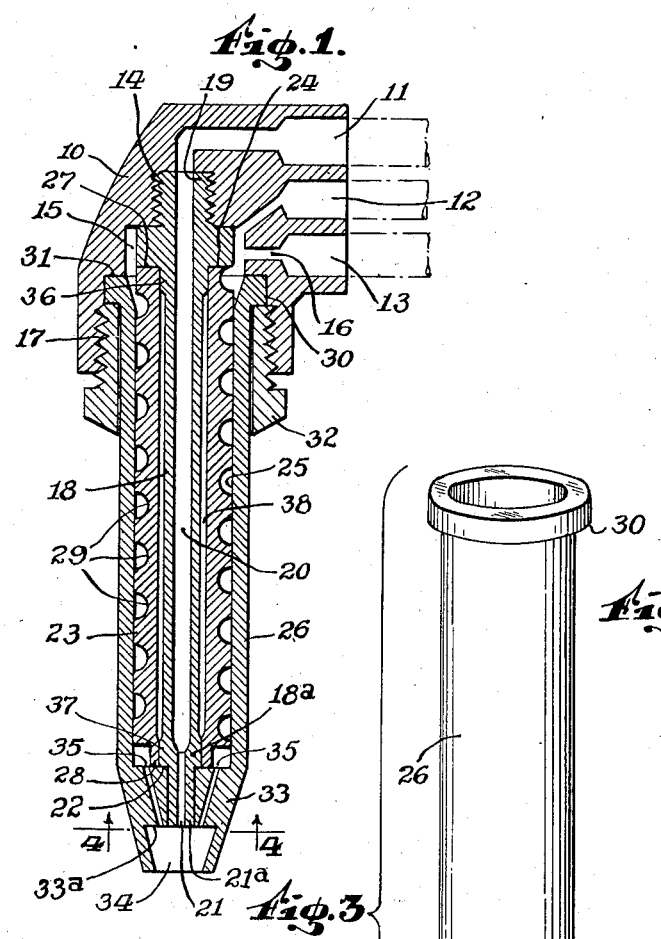
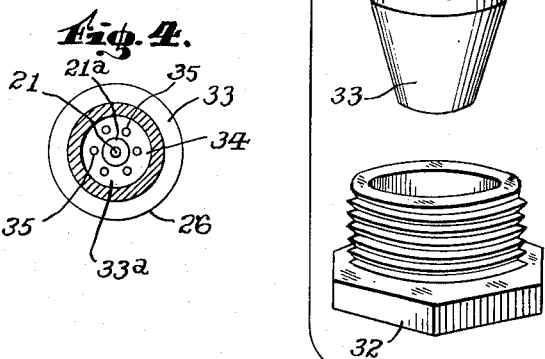
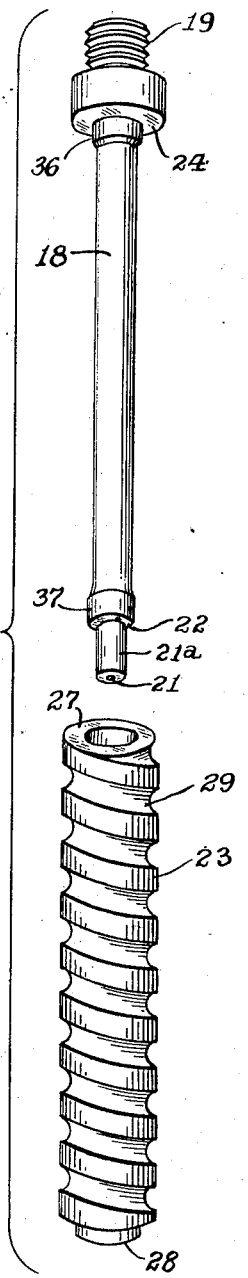
INVENTORS.
ROBERT E. MILLER
ROY J. PETTY
BY Van Deventer & Grier
ATTORNEYS.

Patented Nov. 7, 1944

2,362,213

UNITED STATES PATENT OFFICE 2,362,213

TORCH

Robert E. Miller and Roy J. Petty, New York, N. Y.; said Petty assignor to said Miller Application August 5, 1941, Serial No. 405,464

5 Claims. (Cl. 158—27.4)

This invention relates to improvements in torches and more particularly to a liquid fuel torch adapted to cut metals by using gasoline and burning it with oxygen.

By using the torch head constituting the present invention it is possible to obtain a flame using a mixture of oxygen and liquid hydro-carbon vapor which has all the advantages of oxyacetylene flame without the expense thereof and without the danger incident to the use of such a highly explosive substance as the acetylene.

A further object of the invention is to provide a torch head which is more efficient, cheaper to construct and in which there are few parts that may be easily disassembled for cleaning and repair.

Still another object of the invention is to provide a torch head or nozzle which requires no separate flame for pre-heating, the heating incident to starting the torch being accomplished entirely by the use of low pressure oxygen and gasoline, high pressure oxygen only being supplied to the torch for cutting.

Other features and advantages will hereinafter appear, a preferred embodiment of the device being shown herein by way of illustration.

In the accompanying drawing:

Figure 1 is a longitudinal sectional view of the torch head or nozzle;

Figure 2 is an exploded view of the internal tip member and the internal generating sleeve;

Figure 3 is an external view of the outer sleeve end; and

Figure 4 is a sectional view on the line 4—4, Figure 1.

Referring to Figure 1, the numeral 10 denotes a substantially L-shaped angle casting or head in which are formed the passages 11, 12 and 13. The passage 11 communicates with the threaded bore 14, the passage 12 communicates with the annular bore or mixing chamber 15 and the passage 13 communicates via the interior passage 16 with said chamber 15 at one side thereof, as shown.

The front part of the head 10 has a threaded bore 17 extended inwardly therein to receive a nut to be presently described.

The internal tip, generally denoted by the numeral 18, has an external threaded inner end 19 adapted to engage the threaded bore 14 and the tip 18 has extending from the threaded inner end 19 thereof, nearly to its outer tip, a conduit 20. Near the end of the tip is the contracted transverse inner wall 18a through which passes the contracted conduit or nozzle bore 21.

The tip 18 also has an outer annular seat 22 formed therein for a purpose presently to be described.

The tip 18, having been screwed into place in the head 10, as shown in Figure 1, the internal generating or vaporizing sleeve 23 is slipped thereover, as shown. This sleeve is the proper length and diameter to fit against the shoulder 24 on tip 18 and the inner face 25 of the external sleeve 26, the end surfaces 27, 28 of sleeve 23 being suitably formed to permit of this engagement.

The sleeve 23 can be spirally grooved or slotted in any way to provide a long tortuous passage for the oxygen and gasoline in order to insure the proper heating and admixture of these substances. Such a spiral groove is indicated at 29 in Figure 2. The passage 29 can be formed either in the sleeve 23 or in the inner wall of the outer sleeve 26, or partly in both these members.

The outer sleeve 26, forming part of the casing of the torch, has a flange 30 at the rear end thereof which fits into the bore 31 in the head 10 as shown in Figure 1 and to secure the sleeve in place the nut 32 is provided, which is screwed into the threaded bore 17 of the head 10, thus locking the sleeve 26 and other parts in place.

It will be observed that the removal of this nut 32 which can be slipped off the sleeve 26, in turn permits the sleeve to be slipped off the internal tip 18 without the use of tools and the internal tip 18 can readily be unscrewed from the head.

The outer end 33 of the sleeve 26 forms a conical portion or tip having an inner end wall 33a shown in Figure 4. The outer conical end of 26 forms the center chamber 34 which is connected via a plurality of holes 35 with the groove 29 in the generating sleeve. The extremity 21a of the tip 18 also extends into this chamber 34.

It will be noticed that the outer ends of the holes 35 are radially spaced apart from the hole 21 in the inner tip so that a cone flame is formed at this point.

It will be understood that the usual pipes, with suitable valves, can be connected directly to the head 10 or associated therewith in any suitable manner in order to control the flow of oxygen and gasoline to the conduits 11, 12 and 13. As such arrangements are well known and their construction may vary within wide limits, no attempt is made to show them in detail.

It will be observed that the internal tip 18 is reduced in diameter between its extremities; that is to say, between the shoulders 36 and 37; to prevent contact along the generating sleeve. This provides the insulating chamber 38 and permits the inner tip carrying the high pressure oxygen to remain relatively cool, and further prevents the high pressure oxygen from cooling the sleeve 23, which, with sleeve 26, should remain heated sufficiently to properly vaporize the mixture in the groove 29.

It will also be observed that the opening 34 forms an external nozzle and mixing chamber and that the holes 35 opening therein form preheating holes so that by admitting the gasoline at 13 it will flow out of these holes and pre-heat the torch, a little low-pressure oxygen being admitted at 12 to facilitate this initial heating, the gasoline and oxygen mixing in the groove 29 and vaporizing therein.

As the torch gradually warms up, the generating sleeve 23 becomes hot, thereby further vaporizing the gasoline and when the torch has reached the proper heat and it is desired to cut with it, the high-pressure oxygen is admitted at 11 and passing down through the bore 20 of the inner tip, emerges at the nozzle 21, and passes through the chamber 34, finally emerging as a cutting flame of great efficiency.

The extreme outer end or skirt forming the side wall of the chamber 34 acts to carry the pre-heat by conduction to the parts 26 and 23 and thereby facilitates the operation of the device.

While the device has been described in preferred form, it will be understood that it is not limited to the precise construction herein described as various changes and modifications can be made by those skilled in the art without departing from the scope of the appended claims.

What is claimed is:

1. A liquid fuel torch comprising a head member having passages therein, an internal tip member extending from said head and having a passage extending therethrough in communication with one of the passages in said head, a generating sleeve surrounding said tip member and spaced apart therefrom to form therewith an insulating chamber extending along said tip member, said sleeve member having a tortuous passage formed upon its outer surface in fluid connection with the remaining passages in said head, an outer sleeve extending over and surrounding said generating sleeve, the inner wall of said outer sleeve overlying said tortuous passage in the generating sleeve to form therewith a fluid conduit extending from said head member to a point adjacent the extremities of said sleeves, said outer sleeve having near its outer end a transverse inner wall forming together with an extension of said sleeve a chamber constituting an external nozzle opening to atmosphere and forming the tip of the torch, said transverse inner wall having conduits extending therethrough, said conduits being in fluid connection with said chamber and said tortuous passage, and said chamber also being in communication with the passage in said internal tip member.

2. A liquid fuel torch comprising a head member having fluid passages therein, an internal tip member supported by said head member, said tip having a conduit extending therethrough and in communication with one of said passages in said head, said conduit extending from said head to a point within and adjacent the free end of said tip, said tip having a transverse end wall having an opening therein forming a conduit of lesser diameter than said first conduit comprising a nozzle opening at the free end of the tip in communication with said first conduit, a generating sleeve supported by and surrounding said tip member and spaced apart therefrom to form therewith an insulating chamber extending along said tip member, said sleeve member having a conduit in communication with the remaining passages in said head, an outer sleeve surrounding said generating sleeve and supported in said head member, said outer sleeve having a chamber therein, said tip and generating sleeve conduits discharging into said chamber, and means for removably clamping said generating and outer sleeves to said head.

3. A liquid fuel torch comprising a head member forming a chamber having two separate conduits communicating therewith, said head having an internally threaded bore concentric with said chamber and said bore having a conduit communicating therewith and extending through the body of said head, a tip member having shoulders near its extremities having one end in threaded engagement with said threaded bore, said tip extending outwardly from said head and forming a conduit in fluid communication with the conduit communicating with said bore, a generating sleeve overlying said tip member and supported by said shoulders thereon and therewith forming an insulating chamber within said shoulders and between said tip and sleeve members, said sleeve having a passageway formed therein in communication with said chamber in said head member, and an outer sleeve surrounding said generating sleeve and abutting the free ends of said generating sleeve and tip members to position same relative to said head member and each other, said last sleeve having a chamber formed in the outer end thereof in communication with all said conduits.

4. A liquid fuel torch comprising a head member forming a chamber, a tip member having shoulders and supported on said head member and extending therefrom to form a fluid conduit, a generating sleeve supported on said tip member and forming between the shoulders thereon an insulating chamber, the concentric opposed walls of said tip and sleeve members being spaced apart between said shoulders for substantially their entire length to provide said chamber therebetween, said generating sleeve having a passageway formed therein in communication with said chamber in said head member, and an outer sleeve having a mixing chamber at its free end into which said conduits discharge, said outer sleeve surrounding said tip and generating sleeve members, said outer sleeve being secured to said head member to form part of the outer casing of the torch.

5. In a liquid fuel torch, a housing forming a chamber and having conduits therein, an outer shell forming a casing secured to said housing and having a transverse perforated wall near its outer end to form with the extending wall thereof a mixing chamber forming the tip of the torch, a tip member forming a conduit extending from one of said conduits in said housing to said mixing chamber, a vaporizing sleeve surrounding said tip member and spaced apart therefrom to form an insulating chamber extending substantially the length of said tip member between said housing and the said transverse wall, and means comprising a tortuous conduit formed partly by said sleeve and said outer shell for conducting fluid from said chamber in said housing to said mixing chamber in the tip of the torch.

ROBERT E. MILLER.
ROY J. PETTY.